July 26, 1932.   F. FAUDI   1,868,891
COUPLING
Filed April 24, 1929
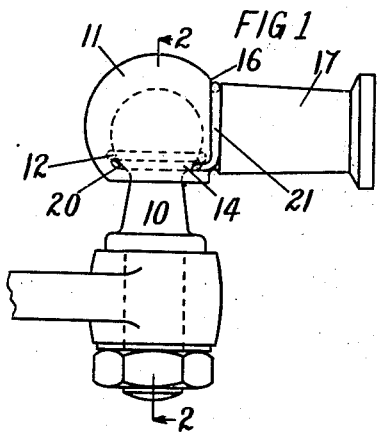
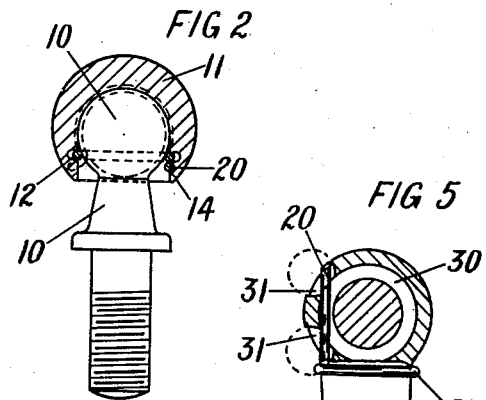
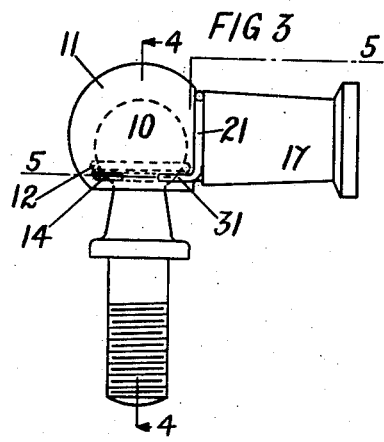
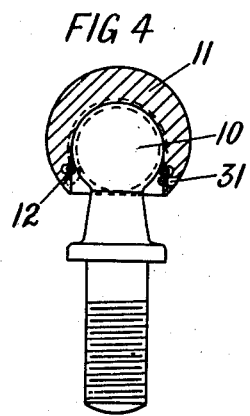
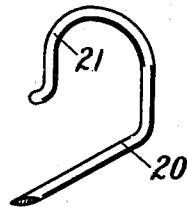
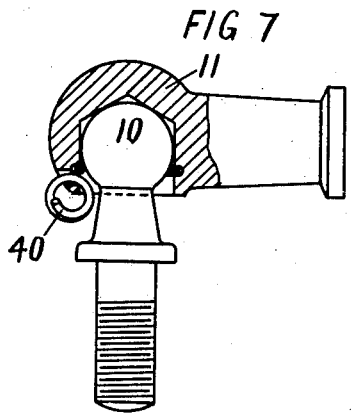
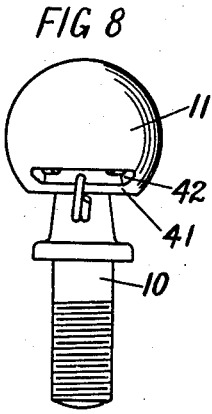
FRITZ FAUDI
INVENTOR
ATTORNEY Patented July 26, 1932

1,868,891

UNITED STATES PATENT OFFICE

FRITZ FAUDI, OF DUSSELDORF-OBERKASSEL, GERMANY

COUPLING

Application filed April 24, 1929, Serial No. 357,771, and in Germany October 9, 1928.

My invention relates to improvement in ball and socket couplings wherein the ball is retained within its socket by a retaining spring which permits the withdrawal of the ball by a strong axially directed pull. This arrangement has the obvious disadvantage that the joint members of this type can readily become inadvertently disconnected.

According to this invention this draw-back is effectively prevented by providing a second securing means which prevents the expanding of the retaining ring and the separation of the joint until after the securing means is removed.

A further object is to produce a cheap and inexpensive securing means which can readily be applied to and easily removed from the joint so that the advantage of the simple disconnection of the joint is not effected, at the same time to produce a securing means that will prevent disconnection when not desired.

The foregoing and other features of my invention will now be described in connection with the accompanying drawing forming part of this specification in which I have represented my coupling in its preferred form, after which I shall point out in the claims those features which I believe to be new and of my own invention.

In the drawing,

Figure 1 illustrates one type of ball coupling embodying my invention.

Figure 2 is a section along the line 2—2 of Figure 1.

Figure 3 is the same as Figure 1, showing a modification of the slot to receive the securing means.

Figure 4 is a section along the line 4—4 of Figure 3.

Figure 5 is a section along the line 5—5 of Figure 3.

Figure 6 is an isometric view of my securing means in its preferred form.

Figures 7 and 8 show a modified form of securing means as applied to the same type of coupling as illustrated in Figures 1, 2 and 3.

In the carrying out of my invention according to Figures 1 and 2, the ball member 10 is held within the socket member 11 by a retaining spring 12. The retaining spring is held in an annular space in socket member 11 provided for its free movement. Below the retaining spring I provide a cut away portion or hole 14 into which fits the end 20 of the securing means 21. The shape of the preferred form of securing means is shown in Figure 6. The end 21 is adapted to embrace and be securely held in an annular groove 16 in the socket member 11.

It will be observed that the shank 17 of the socket member 11 is slightly tapered away from the annular groove 16. The circular portion 21 of the retaining means is adapted to embrace this taper at its smallest part, when the end 20 is inserted in the cut-away portion 14. The securing means is then slipped home, while the end 21 thereof rides over and into the annular groove 16, thus preventing the expansion of the locking ring 12 and thereby locking the ball and socket member from being inadvertently disconnected.

In Figures 3, 4 and 5 the space or slot provided for the end 20 of my securing means is obtained by cutting two small slots 31 into the socket member 11 to the annular space 30 in which is retained the retaining spring. In Figures 7 and 8 the securing means and slot is given a slightly different shape wherein the securing means takes the form of a split ring 40 which embraces the portion of the socket member 41 formed by the slot 42 cut into the wall of the socket member 11.

I wish it distinctly understood that my coupling herein described and illustrated is in the form in which I desire to construct it and that changes or modifications may be made without departing from the salient features of my invention and I therefore intend the following claims to cover such modifications as naturally fall within the lines of invention.

I claim:—

1. In a ball and socket coupling where the ball is retained in its socket in working position by means of a wire expansion ring in a groove, securing means in said groove for holding said expansion ring in contracted position to prevent the inadvertent withdrawal of the ball from its socket.

2. The device of claim 1 in which the securing means is a wire support having a spring loop which embraces the socket member.

3. The device of claim 1 in which the securing means is readily removable from the grooves.

In witness whereof I affix my signature.

FRITZ FAUDI.